[United States Patent Office — 3,591,671 — Patented July 6, 1971]

3,591,671
AGGLOMERATION OF PLASTIC PARTICLES IN LIQUID SUSPENSION
William E. Burt and Michael E. Kucsma, Baton Rouge, La., assignors to Ethyl Corporation, New York, N.Y.
No Drawing. Filed Aug. 28, 1968, Ser. No. 755,835
Int. Cl. B01j 2/06
U.S. Cl. 264—117                            7 Claims

ABSTRACT OF THE DISCLOSURE

A process for preparing large particles of plastic materials, particularly polyvinyl chloride. A substantially water immiscible solvent for the plastic material is first dispersed in an aqueous medium. The aqueous medium is heated to a temperature in the range of from about 45° C. to about 85° C. The water-solvent mixture is stirred to disperse the solvent into fine droplets. Small particle size plastic material is then added to the water-solvent mixture while continuing the stirring. Stirring is continued until agglomerates of the desired size are formed. Solvent is removed by distillation and the large particle size plastic material is recovered by centrifuging or filtering. Particles produced by this process are suitable for use as a filter media.

BACKGROUND OF THE INVENTION

Field of the invention

This invention relates to the process for the preparation of large particle size plastic agglomerates or granules.

Description of the prior art

In Belgian Pat. No. 691,192 there is disclosed a process for granulating solid pulverulent material. The patent describes the preparation of granules of plastic material, in particular polyvinyl chloride, wherein plasticizers, stabilizers, fillers, etc., may be incorporated into the plastic material in the granulation process. Preparation of rigid granules of polyvinyl chloride is described which contain no additives, e.g., Examples 16 and 17. The patent teaches in the above noted examples that granules of particle size from about 1 mm. (0.0394 inch or 18 mesh) to about 4 mm. (0.157 inch or 5 mesh) can be prepared utilizing the disclosed process.

However, attempts to prepare polyvinyl chloride granules having a high percentage or particles in a size from about 12 mesh (0.066 inch or 1.68 mm.) to about 30 mesh (0.0232 inch or 0.59 mm.) have not been successful using the procedure in the above noted patent. The particles formed contain a very high percentage of either coarse or fine size granules depending upon the ratio of water to solvent and the temperature utilized. Further, the particles produced by this process were found to be friable, fragile and unsuited for use as particles for a filter media.

In co-pending patent application, Ser. No. 716,908, filed May 28, 1968, also assigned to the assignee of the present invention, there is disclosed an effective filtration process and apparatus which utilizes polyvinyl chloride particles having a large surface area. These particles are preferably of a size between 16 and 25 mesh. Heretofore, the only source for particles of this size has been a small quantity derived from the tailings retained on the coarse screen used to size commercial grade suspension process polyvinyl chloride resin.

Therefore, there is a need for a process for producing large size plastic particles particularly suited for use as a filter media.

SUMMARY OF THE INVENTION

It is an object of the present invention to provide a process for the preparation of large size plastic particles from small plastic particles.

It is also an object of the present invention to provide a process for the production of large size plastic particles having a high crush strength.

It is a further object of the present invention to provide a process which will produce a large percentage of plastic particles within a desired size range from the starting material.

The foregoing and other objects of the invention may be carried out by a process for producing large particles of a thermoplastic material which includes dispersing a substantially water immiscible solvent for the thermoplastic material in an aqueous medium. The aqueous medium and dispersed solvent are then heated to a temperature within the range from about 45° C. to about 95° C. A quantity of small size particles of the thermoplastic material are then added to the aqueous medium-solvent mixture. Stirring is continued until the large particles of the thermoplastic material are formed. The large particles are recovered by suitable means.

DESCRIPTION OF THE PREFERRED EMBODIMENTS

The method of the present invention may utilize any small size particulate thermoplastic material which is at least partially soluble in some solvent or solvent system. Examples of thermoplastic materials which may be formed into large, strongly bonded particles by the process of the present invention are polyethylene (both high and low density), polypropylene, copolymers of polyethylene with other hydrocarbons, halogenated hydrocarbon polymers such as polyvinyl fluoride, polyvinyl chloride, copolymers of vinyl chloride such as vinyl chloride-vinyl acetate copolymers, polymethacrylates, polycarbonates, polysulfones, polyesters, and others.

The process of the present invention is particularly useful in forming large size particles of polyvinyl chloride from material made either by the suspension or the emulsion polymerization technique. The present process is particularly advantageous in that it is not necessary to dry the small size polymer particles made by conventional suspension or emulsion polymerization since the particles may be granulated to produce non-friable large size particles directly from the original suspension or emulsion liquids.

Any number of suitable solvents may be utilized for preparing the solvent dispersion in an aqueous medium, preferably water. The only requirement is that the plastic material to be granulated be at least partially soluble in the selected solvent whereby fusion of the smaller particles may be effected at temperatures below the boiling point of water. Among suitable solvents for the more common thermoplastic materials enumerated above are alicyclic hydrocarbons, aromatic hydrocarbons, chlorinated hydrocarbons, ketones, ethers, esters, and alcohols or mixtures thereof. Suitable alicyclic hydrocarbons are cyclopentane, cyclooctane, cyclohexane, and others. Among the suitable aromatic hydrocarbons are benzene, toluene, xylene, alkyl-substituted benzenes and xylenes. Suitable chlorinated hydrocarbons are methylene chloride, carbon tetrachloride, ethylene dichloride, 1,1,1-trichloroethane, trichloroethylene, and perchloroethylene. Suitable ethers are diethyl ether, n-propyl ether, isopropyl ether, n-butyl ether, and isobutyl ether. Among the suitable esters are ethyl acetate, butyl acetate, amyl acetate, and isoamyl acetate. Suitable ketones are methyl ethyl ketone, diethyl ketone, methyl isobutyl ketone, diisobutyl ketone and cyclohexanone. Among the suitable alcohol solvents is cyclohexanol.

The solvents will preferably have a boiling point between about 30° C. and about 250° C., preferably from about 40° C. to 160° C. It is preferred that the solvent be readily volatilized by steam in order that steam distillation may be used to recover the solvent.

In preparing the dispersion of the solvent in the aqueous medium, e.g., water, the ratio of the aqueous medium to solvent used should be in the range of from about 0.5:1 to about 4:1. More preferably, the ratio should range from about 0.75:1 to 2:1. Approximately 1 to 4 parts of the solvent should be used for each 1 part of small particle size plastic material. Preferably from about 2 to about 4 parts of water are used for each 1 part of thermoplastic material.

In preparing the large size granules according to the process of the present invention the proper quantity of solvent is dispersed in an aqueous medium, preferably water, by means of high shear stirring mechanism. It is desirable that the solvent be dispersed in the form of very fine droplets throughout the aqueous medium before the small particle size plastic material is added thereto. The solvent-aqueous medium mixture is then heated to between 45° C. and 90° C. while stirring is continued. More preferably the mixture is heated to between 50° C. and 85° C. However, the mixture may be heated to the desired temperature before stirring is started if desired. When the solvent-aqueous medium mixture reaches the desired temperature, the proper quantity of small particle size plastic material is added to the stirred mixture. Vigorous stirring needs to be discontinued very soon after large agglomerates of solvent-swollen resin are formed. If not, particle size will be reduced. In fact, the stirring rate is preferably reduced after all the resin has been added and kept at a low rate until the particles are well formed. When the plastic material has formed into the desired larger size granules or particles (usually after a stirring and heating time from about 5 to about 15 minutes) the solvent is then removed from the mixture by a suitable means, such as combination of heat and vacuum, steam distillation, or any other suitable means. To minimize clinkers, mild agitation is continued during solvent removal. It helps reduce adhesion of masses of particles to container walls. The large particle size plastic material is then recovered by conventional techniques such as centrifuging or filtering. The particles may be dried in a pan or rotary drier or by other suitable means.

If desired, the process of the present invention may be carried out by adding the proper amount of a solvent directly to a suspension of the smaller size thermoplastic particles as produced from either a suspension or emulsion type polymerization. The latex or suspended particles are heated to the desired temperature and then the solvent is slowly added with stirring which is continued until the larger size granules have formed. This technique is particularly useful in preparing large size polyvinyl chloride particles directly from either suspension or emulsion polymerizations. The larger particles can be recovered using the same facilities as used for resin recovery in normal polyvinyl chloride resin production.

The plastic particles prepared by the present process have a diameter from about less than 0.1 mm. to about 3 mm. in size. The particles will generally have a somewhat irregular shape with a porous, rough surface. The particles are well fused and exhibit a high crush strength.

If desired, additives may be incorporated in the particles during the granulating step.

The following examples illustrate the practice of the present process:

Example 1.—In a resin reactor flask 300 ml. of water, 150 ml. of ethylene dichloride were combined. A turbine type stirrer driven by a high speed air motor was used to vigorously stir and disperse the ethylene dichloride in the water in the form of fine droplets. The solvent-water dispersion was heated to 65° C. and 100 grams of a suspension type polyvinyl chloride resin (Ethyl SM-225) was slowly added. Stirring was continued at a slow rate for five minutes after completion of the polyvinyl chloride resin addition. The solvent was recovered from the flask by steam distillation. The polyvinyl chloride agglomerates were recovered by filtration through a Buchner funnel. The large resin particles were dried in a pan in an oven at 60° F. for 10 hours. The product was screened through a 12 and a 30 mesh screen. Thirty-two grams of material was retained on the 12 mesh screen, 57 grams was retained on the 30 mesh screen and 14 grams passed through the 30 mesh screen. The granulated material was quite hard and could not be easily crushed. Examination of the material under a microscope disclosed that the granules had a very irregular, non-uniform, rough surface. Tiny protuberances appear to be fused to the surface of the sphere. The particles were fairly porous.

Example 2.—The same equipment and procedure were utilized as in Example 1 with the exception that 450 ml. of water and 225 ml. of ethylene dichloride and 150 grams of resin were used. The temperature of the solvent-water dispersion was raised to 50° C. and then the resin was slowly added with vigorous stirring. After addition of all the resin, an additional 100 ml. of water was added to promote ease of mixing. Stirring was continued for approximately two minutes. The solvent was recovered by steam distillation and the large particle size resin product was recovered by filtration through a Buchner funnel. The product had a particle size such that 24 grams was retained on the 12 mesh screen, 75 grams on the 30 mesh screen with 42 grams passing through the 30 mesh screen. The polyvinyl chloride granules produced were hard and non-friable.

Example 3.—The same equipment and procedure were used as in Example 2, with the exception that the solvent-water dispersion was heated to 60° C. before addition of the polyvinyl chloride resin. The granulated product had a particle size distribution such that 39 grams was retained on a 12 mesh screen, 99 grams on the 30 mesh screen, with 17 grams passing through the 30 mesh screen. The granulated product was hard and non-friable.

Example 4.—The same apparatus and procedure were used as in Example 2, with the exception that the temperature of the solvent-water dispersion was raised to 65° C. and held there during the resin addition and stirring steps. The polyvinyl chloride agglomerates produced had a particle size distribution such that 19 grams was retained on a 12 mesh screen, 94 grams on a 30 mesh screen, with 32 grams passing through the 30 mesh screen. The agglomerates produced were hard and non-friable.

Example 5.—The same procedure and apparatus were used as in Example 4. The granulated polyvinyl chloride product has a particle size distribution such that 32 grams was retained on a 12 mesh screen, 91 grams on a 30 mesh screen, with 30 grams passing through the 30 mesh screen. The product was hard and non-friable.

Example 6.—The same procedure and apparatus was used as in Example 3, with the exception that a lower molecular weight suspension type polyvinyl chloride resin (Ethyl SM-200) was used. The polyvinyl chloride agglomerates produced had a particle size distribution such that 27 grams was retained on a 12 mesh screen, 101 grams on a 30 mesh screen, with 18 grams passing through the 30 mesh screen. The product was hard and non-friable.

Example 7.—The same equipment and procedure were used as in Example 6, with the exception that a lower molecular weight polyvinyl chloride suspension resin (Ethyl SM-175) was used. The polyvinyl chloride product produced had a particle size such that 51 grams was retained on a 12 mesh screen, 88 grams was retained on a 30 mesh screen, with 6 grams passing through the 30 mesh screen. The product was hard and non-friable.

Example 8.—The same apparatus and procedure were used as in Example 7, with the exception that a higher molecular weight polyvinyl chloride resin (Ethyl SM- 250) was used and stirring was continued during the steam distillation step. The polyvinyl chloride product produced had a particle size distribution such that 34 grams was retained on a 12 mesh screen, 20 grams on a 30 mesh screen with 90 grams passing through the 30 mesh screen. Results indicate that continued, vigorous stirring during steam distillation produces a product having too large a percentage of fine particles to be useful as a filtration media.

Example 9.—The same equipment was used as in Example 1. To 400 ml. of water in the resin flask 200 ml. of ethylene dichloride was slowly added while stirring vigorously. After complete dispersion of the solvent in the water the temperature was raised to 60° C., and 150 grams of fine particle Ethyl SM-225 resin was added to the solvent-water dispersion. The mixture was difficult to stir and 150 ml. of additional water was added. The solvent was removed by steam distillation without any stirring. The granulated polyvinyl chloride product produced had a particle size distribution such that 16 grams was retained on a 12 mesh screen, 88 grams on a 30 mesh screen, with 49 grams passing through the 30 mesh screen. The product was hard and non-friable.

Example 10.—The same procedure and apparatus was utilized as in Example 9, with the exception that the polyvinyl chloride resin used was a composite of fine material which passed the 30 mesh screen in the above examples. Again 100 ml. of water was added to facilitate stirring. The agglomerated product was steam distilled without agitation. The polyvinyl chloride particles produced had a size distribution such that 14 grams was retained on a 12 mesh screen, 77 grams was retained on a 30 mesh screen, with 61 grams of fine material passing through the 30 mesh screen. The foregoing demonstrates that fine particles may be recycled in the process of the present invention. The particles produced were hard and non-friable.

Example 11.—The same apparatus and procedure were used as in Example 10, with the exception that the polyvinyl chloride resin used for feed was an emulsion type resin, Ethyl EH-230. The polyvinyl chloride granules produced had a particle size such that 10 grams was retained on a 12 mesh screen, 88 grams was retained on a 30 mesh screen, with 50 grams of material passing through the 30 mesh screen. This example clearly demonstrates that emulsion type polyvinyl chloride resins can be successfully used in the present process to produce large, hard polyvinyl chloride agglomerates having a size and strength suitable for use as filter media.

Example 12.—In place of the resin flask and turbine blade stirrer, a large, open, metal bowl was used as the mixing container and stirring was carried out by utilizing a kitchen type double beater mixing apparatus. Stirring was continued for about 5 minutes and the product was recovered from the water-solvent mixture by filtration without steam distillation recovery of the solvent. The product was dried in an oven at 60° C. for 10 hours. The polyvinyl chloride granules produced had a particle size distribution such that 6 grams was retained on a 12 mesh screen, 115 grams was retained on a 30 mesh screen, with 19 grams of material passing through the 30 mesh screen. The product was hard and non-friable. The foregoing demonstrates that the particular configuration of stirrer used is not critical.

Example 13.—The same apparatus and procedure were used as in Example 10. Again the feed polyvinyl chloride resin was made up of a composite of fine material passing the 30 mesh screen used in previous examples. The product produced had a particle size distribution such that 46 grams was retained on a 12 mesh screen, 80 grams was retained on a 30 mesh screen with 15 grams of material passing through the 30 mesh screen. The product was hard and non-friable.

Example 14.—The same kitchen type mixer was used as in Example 12. Two hundred ml. of trichloroethylene was added to 150 ml. of water. The solvent was thoroughly dispersed in the water and then 400 grams of a 37 percent solids content latex (150 grams of Ethyl EH-250 emulsion type polyvinyl chloride resin and 250 grams of water) was added to the solvent-water dispersion with rapid stirring while maintaining the temperature of the mixture between 65–70° C. After stirring for 5 minutes, 50 ml. of saturated sodium chloride solution was added to precipitate the resin. An additional 100 ml. of water was added and steam distillation carried out to recover the solvent. The polyvinyl chloride particles produced had a size such that 19 grams of material was retained on a 12 mesh screen, 74 grams was retained on a 30 mesh screen, with 48 grams of material passing through the 30 mesh screen. The fine material passing the 30 mesh screen was further screened to get a breakdown of a particle size for the fines. Twenty-five grams of the fines material was retained on a 60 mesh screen, 6 grams was retained on a 100 mesh screen and one gram of material passed through the 100 mesh screen. The particles were hard and non-friable.

Example 15.—A five-gallon pail was utilized as the mixing vessel and a large propeller type air driven stirrer was used to provide the mixing. 4,500 ml. of water and 1,800 ml. of ethylene dichloride were added to the pail and heated to 65° C. with rapid stirring. 1,250 grams of suspension type polyvinyl chloride resin (Ethyl SM-225) was added slowly with rapid stirring. One-half of the mixture was transferred to another vessel and both parts were steam distilled to recover the solvent. The product was recovered by filtration then dried in an oven. The large particle polyvinyl chloride product produced had a particle size distribution such that 272 grams of material was retained on a 12 mesh screen, 688 grams was retained on a 30 mesh screen and 285 grams of material passed through the 30 mesh screen.

In order to compare the process of the present invention with that disclosed in the aforementioned Belgian Patent 691,192 granulated polyvinyl chloride resin was produced according to Examples 16 and 17 of the Belgian patent.

Example 16 (prior art).—The same apparatus was utilized as in Example 1. Two hundred parts of water, 140 parts of toluene, 20 parts of ethyl acetate, and 100 parts of suspension type polyvinyl chloride resin (Ethyl SR-225) were added to the flask. The materials were heated and stirring commenced and continued throughout the heating period where the temperature was maintained in the range of 40–50° C. After granulation had occurred 300 additional mls. of water was added, stirring stopped and the solvents were recovered by steam distillation. The granules produced had a particle size distribution such that 59 grams was retained on a 12 mesh screen, 28 grams was retained on a 30 mesh screen and 20 grams of material passed through the 30 mesh screen. The agglomerates produced by this technique were fragile and could be easily crushed by slight pressure of the fingers. Additionally, it can be seen that this process produces an undesirably large amount of coarse particles unsuited for use as filter media.

Example 17 (prior art).—The same procedure and apparatus were used as in Example 16, with the exception that an emulsion type polyvinyl chloride resin (Ethyl EH-230) was used. The polyvinyl chloride particles produced had a size distribution such that 28 grams of material was retained on a 12 mesh screen, 22 grams was retained on a 30 mesh screen with 50 grams of material passing through the 30 mesh screen. The particles were very fragile and could be readily crushed by finger pressure indicating that they were not suitable for use as filter media. In addition, the particle size distribution was such that an excessive amount of fine particles were produced.

Example 18 (prior art).—The same apparatus and procedure were used as in Example 16, with the exception that ethylene dichloride was substituted for the toluene and Ethyl SMF-225 polyvinyl chloride resin was used. The polyvinyl chloride particles produced had a size distribution such that 10 grams was retained on a 12 mesh screen, 6 grams was retained on a 30 mesh screen and 77 grams passed through the 30 mesh screen. The particles were very fragile. The major portion of the particles are also too small for use as filter media.

What is claimed is:

1. A process for preparing, from particulate thermoplastic material, non-friable agglomerates having a particle size such that at least 50% of said agglomerates pass a 12 mesh screen while being retained on a 30 mesh screen, said agglomerates having strength and hardness for use as filter media, comprising:
   (a) dispersing a substantially water immiscible solvent for said thermoplastic material in an aqueous medium to form a dispersion thereof, the ratio of said aqueous medium to said solvent being about 0.5:1 to 4:1,
   (b) heating said dispersion to a temperature of about 45° C., to 90° C.,
   (c) adding particles of said thermoplastic material to said heated dispersion in a ratio of approximately 1 to 0.25 part of said material to said solvent, and stirring said dispersion for about 5 to about 15 minutes thereafter to cause said thermoplastic particles to form said agglomerates, and
   (d) recovering said formed agglomerates.

2. The process of claim 1 wherein said thermoplastic material is polyvinyl chloride.

3. The process of claim 1 wherein said particles of thermoplastic material are suspended in water before being added to the aqueous medium-solvent mixture.

4. The process of claim 1 wherein said solvent is selected from the group consisting of alicyclic hydrocarbons, aromatic hydrocarbons, chlorinated hydrocarbons, ketones, ethers, and esters.

5. The process of claim 1 wherein said solvent is selected from the group consisting of benzene, toluene, xylene, methylene chloride, carbon tetrachloride, ethylene dichloride, trichloroethylene, perchloroethylene, 1,1,1-trichloroethane, cyclohexanol, cyclohexanone, and butyl acetate.

6. The process of claim 1 wherein additional aqueous medium is added immediately after completion of the addition of said particles of thermoplastic material.

7. The process for preparing, from particulate polyvinyl chloride, non-friable agglomerates having a particle size such that at least 50% of said agglomerates pass a 12 mesh screen while being retained on a 30 mesh screen, said agglomerates having strength and hardness for use as filter media, comprising:
   (a) dispersing a substantially water immiscible solvent for said polyvinyl chloride in an aqueous medium to form a dispersion thereof, the ratio of said aqueous medium to said solvent being about 0.5:1 to 4:1,
   (b) heating said dispersion to a temperature of about 45° C. to 90° C.
   (c) adding particles of said polyvinyl chloride to said heated dispersion in a ratio of approximately 1 to 0.25 parts of said polyvinyl chloride to said solvent, and stirring said dispersion for approximately 2 minutes thereafter to cause said polyvinyl chloride particles to form said agglomerates, and
   (d) recovering said formed agglomerates.

References Cited

UNITED STATES PATENTS

| | | | |
|---|---|---|---|
| 2,923,034 | 2/1960 | Dickie et al. | 264—123 |
| 3,230,282 | 1/1966 | Campagne et al. | 209—5 |
| 3,268,071 | 8/1966 | Puddington et al. | 209—5 |
| 3,449,483 | 6/1969 | Quist | 264—117 |
| 3,493,500 | 2/1970 | Volk | 209—5 |

OTHER REFERENCES

Farnand et al.: "Spherical Agglomeration of Solids in Liquid Suspension," Canadian Jour. Chem. Engng., April 1961, pp. 94–97.

ROBERT F. WHITE, Primary Examiner

J. R. HALL, Assistant Examiner